E. T. HEGGLAND.
DITCHING MACHINE.
APPLICATION FILED DEC. 29, 1914.
1,153,916.
Patented Sept. 21, 1915.
3 SHEETS—SHEET 1.
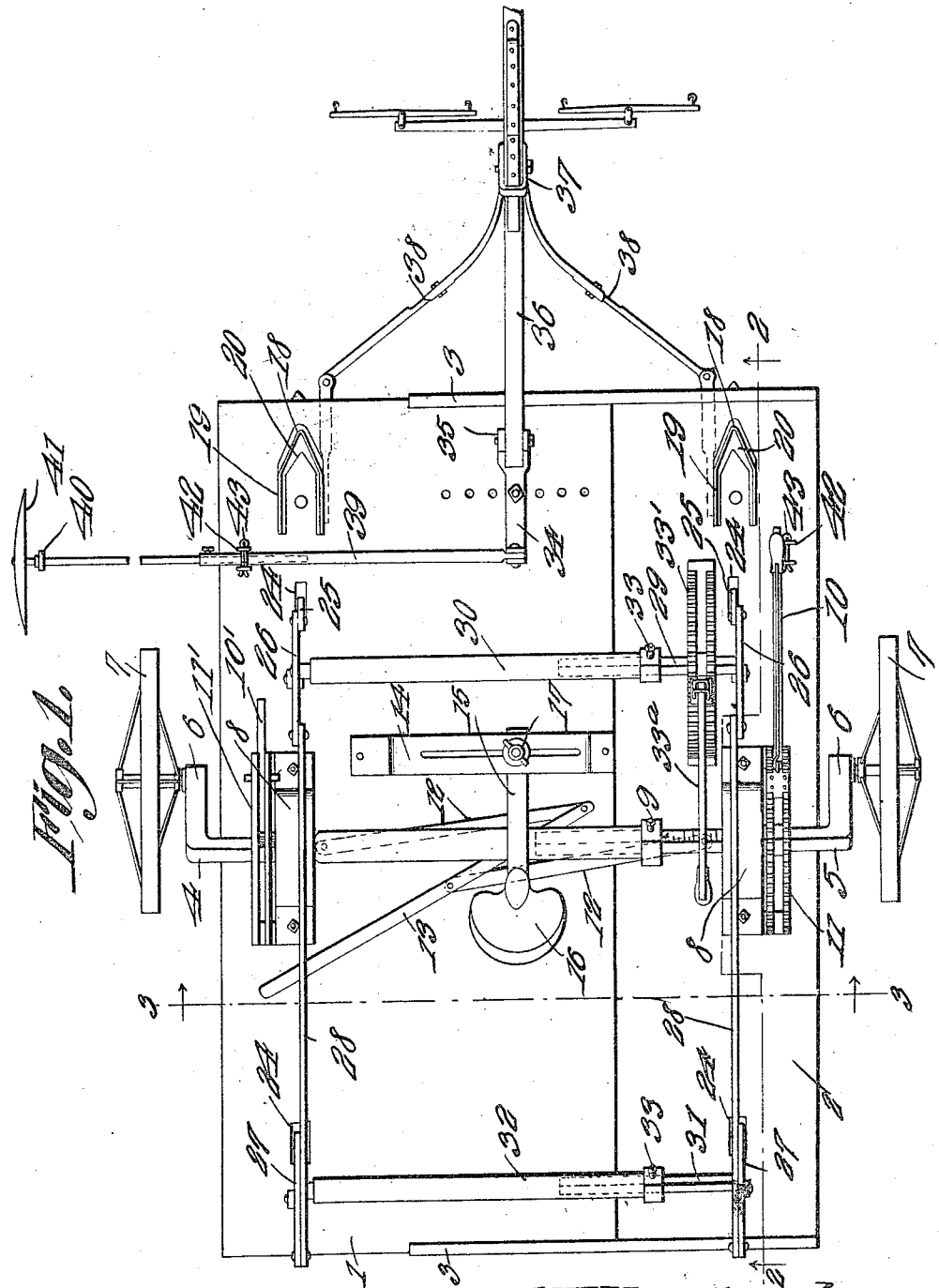
Witnesses
E. T. Heggland, Inventor
by C. A. Snow & Co.,
Attorneys

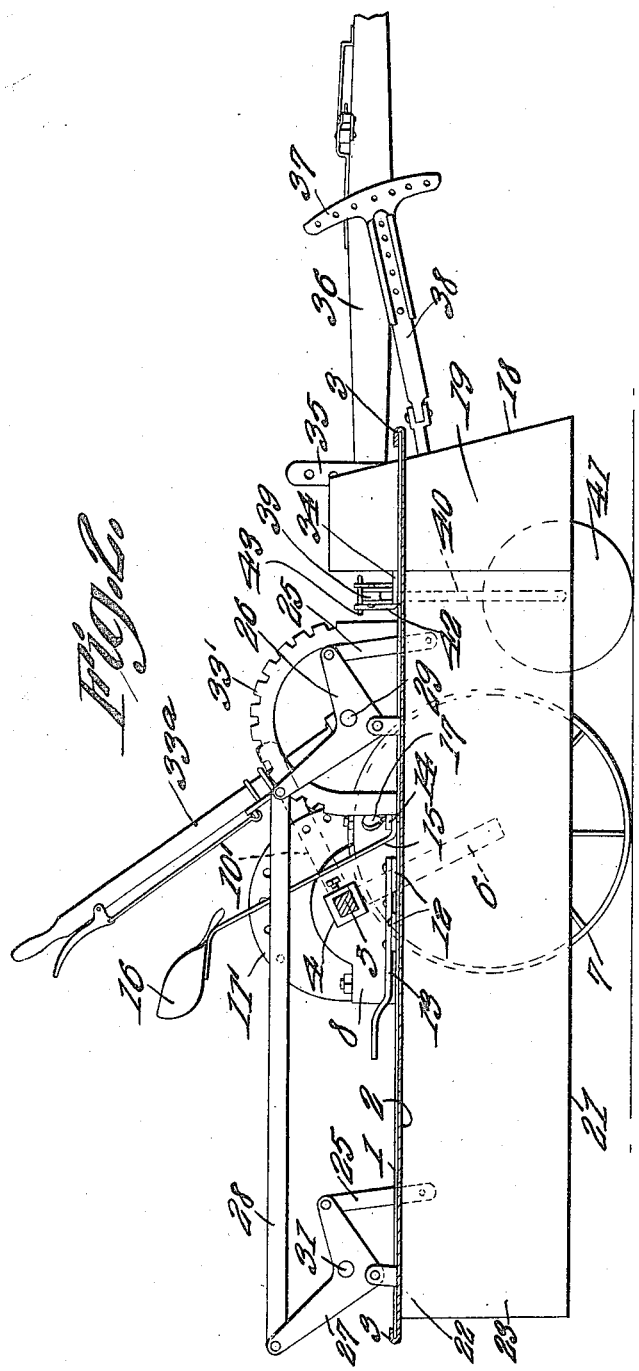

E. T. HEGGLAND.
DITCHING MACHINE.
APPLICATION FILED DEC. 29, 1914.
1,153,916.
Patented Sept. 21, 1915.
3 SHEETS—SHEET 3.
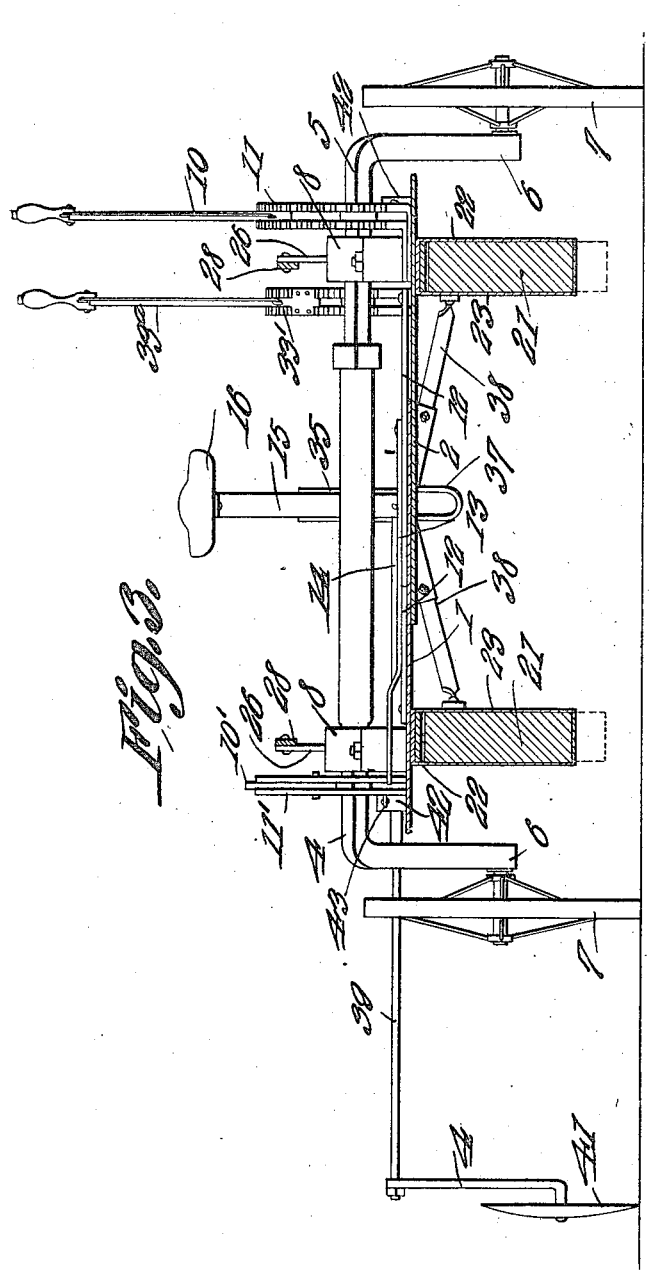
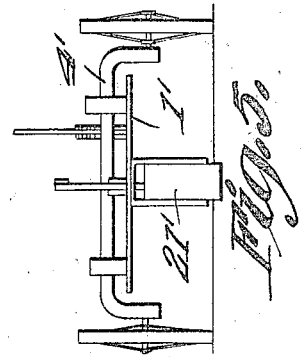
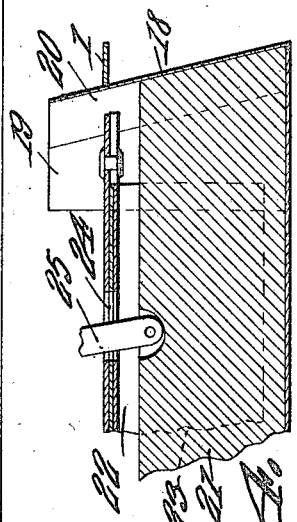
Witnesses
E. T. Heggland, Inventor
by ———— Attorneys

UNITED STATES PATENT OFFICE.

EVEND T. HEGGLAND, OF MINA, NEVADA.

DITCHING-MACHINE.

1,153,916. Specification of Letters Patent. Patented Sept. 21, 1915.

Application filed December 29, 1914. Serial No. 879,509.

*To all whom it may concern:*

Be it known that I, EVEND T. HEGGLAND, a citizen of the United States, residing at Mina, in the county of Mineral and State of Nevada, have invented a new and useful Ditching-Machine, of which the following is a specification.

The present invention appertains to ditching machines, and aims to provide a novel and improved machine especially adapted for cutting or plowing irrigating trenches or ditches.

It is the object of the present invention to provide a machine of the nature indicated, adapted to be drawn over the soil, and having a depending vertically adjustable plow share and packer trailing or following the same, means being provided for adjusting the plow share and packer vertically to regulate the depth of the furrow or trench formed by the share and packer.

Another object of the present invention is to provide a ditching machine, which may be readily drawn from place to place, and whereby the ditch-forming element or elements may be readily brought into or out of engagement with the soil, as desired by the operator.

A further object of the invention is to provide a machine of the character specified, embodying a pair of ditch-forming devices, in combination with means for simultaneously adjusting the said devices vertically, and means whereby the said devices may be adjusted transversely relative to one another, to vary the width between the trenches or ditches, within practical limits.

It is also within the scope of the present invention, to provide an appliance for forming trenches or ditches, which will be improved generally in its construction to enhance the utility of the appliance, and to promote the efficiency of the several devices embodied in the machine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein—

Figure 1 is a plan view of the ditching machine, portions being broken away. Fig. 2 is a longitudinal section taken on the line 2—2 of Fig. 1. Fig. 3 is a transverse or cross section taken on the line 3—3 of Fig. 1. Fig. 4 is a sectional detail of one of the plow shares and the forward end portion of the corresponding packer. Fig. 5 is a reduced rear end view of a modified form of the invention.

In carrying out the present invention, there is provided a laterally extensible and contractible body, constituting flat side sections 1 and 2, which have their adjacent portions overlapped, the body section 2 having guides or slide ways 3 at its front and rear ends in which the ends of the body section run and are slidable to properly guide the sections for transverse adjustments relative to one another. The body is wheel mounted, and to this end an extensible arched axle is employed, the same embodying the sections 4 and 5 and having their adjacent ends telescoped. The telescoped portions of the axle sections 4 and 5 are preferably non-circular in cross section, so as to be constrained against rotary or oscillatory movements relative to each other. The remote ends of the axle sections 4 and 5 are provided with the angular portions or arms 6, to which the ground wheels 7 are journaled. The arch axle extends over the body intermediate the ends thereof, and the sections 4 and 5 of the axle are journaled through bearings 8 secured upon the body sections 1 and 2 adjacent the side edges of the body, the telescoping portions of the axle sections being disposed between the bearings 8. The outer or tubular telescoping portion is provided with a set screw or clamping bolt 9 for holding the axle sections at any extended or adjusted position to which they are set.

As a means for oscillating and holding the arched axle, a lever 10 is secured to the axle section 5 outside of the respective bearing 8, and is provided with hand-controlled means for engaging a segment 11 mounted upon the body section 2 adjacent the outer side of the bearing 8 secured upon the said body section. Similarly, a lever 10' is secured to the axle section 4 outside of the bearing 8 which is secured upon the body section 1, and which lever 10' is adapted to be locked to a suitable segment 11' mounted upon the body section 1, adjacent the outer side of the last mentioned bearing 8. Thus, when the lever 10' is released from the segment 11', the lever 10 may be swung by disengaging it from the segment 11, and the arched axle may then be swung or oscillated, as desired, to either raise or lower the ground wheels 7 relative to the body. After the ground wheels have been set properly, the lever 10 may be engaged to the segment 11 to hold the axle, especially the section 5 thereof, against movement, and the lever 10' may then be locked to the segment 11'. In this connection, it is to be noted that the body sections 1 and 2 may be adjusted laterally relative to one another, without interferring with the adjustment of the arched axle, it being noted that the arch axle is extensible and contractible so that the sections 4 and 5 of the axle which are journaled upon the respective body sections 1 and 2, may be adjusted laterally with the body sections.

As a means for conveniently extending and retracting the body sections 1 and 2, a pair of links 12 have their remote ends pivoted to the body sections next inside the bearings 8, and have their adjacent ends connected to a hand lever 13 disposed snugly over the body section 1. When the lever 13 is swung in one direction, the same will tend to separate the links 12, to thereby separate the body sections, and when the lever is swung to the other direction, it will pull or draw the body sections together, whereby the body may be readily extended and contracted laterally.

An operator's seat is mounted for lateral adjustments upon the body, and to this end a transverse slotted guide 14 is secured upon the body section 1 directly in advance of the arch axle, and the lower end of the seat standard 15 is engaged under the guide 14 and carries the operator's seat 16 at its upper end. The lower end of the seat standard 15 is slidable transversely within the guide 14, and is provided with a clamping bolt 17 engaging upwardly through the slot of the guide 14, to clamp the seat standard at any laterally adjusted position. Thus, as the body sections are adjusted relative to each other, the seat may be adjusted, so as to assume a position midway between the side edges of the body, which is desirable.

A pair of ditch-forming devices is carried by the body, one device being carried by each of the body sections, and each of the said devices comprising a plow share 18 having the rearwardly projecting side members or wings 19. The nose of the plow share 18 is inclined, and the upper end portion of the share is slidable or movable vertically through an opening 20 provided in the corresponding body section. The openings 20 are arranged at the forward end of the body and adjacent the side edges thereof, the plow shares thereby being arranged at the front end of the body and adjacent the side edges of the body.

A packer 21 is employed in connection with each of the plow shares 18, and is relatively long and flat-sided, the forward end of each packer 21 projecting between the sides or wings 19 of the corresponding plow share, and having the plow share secured thereto. Thus, the plow shares and packers are secured together, to move vertically with each other, the plow shares being carried by the forward ends of the packers. The packers 21 are disposed underneath the respective body sections, and are of a width approximately equal to the width of the furrow or ditch to be formed. The packers 21 are also of considerable height, the upper end portions of the plow shares, however, projecting above the upper edges of the packers, and working through the openings 20 of the body sections, as above indicated.

As a means for guiding the packers 21 for vertical movements, and for closing the gaps bewteen the packers and the body sections, a pair of inverted channel members 22 have their backs secured to the bottoms of the body sections 1 and 2 above the packers 21, and are provided with depending flanges or aprons 23 overlapping the sides of the respective packers 21. Thus, the packers 21 are slidably received by the channel members or guides 22, and furthermore, the channel members or guides 22 will close the gaps between the packers 21 and the body sections, when the packers are depressed, as seen in Fig. 4.

As a means for adjusting or raising and lowering the packers, and the plow shares carried by the front ends thereof, the body sections and backs of the channels or guides 22 are provided with front and rear openings or slots 24 through which links 25 are passed. A pair of links 25 are provided for each packer, the lower ends of the links being pivoted to the upper edge portions of the packers, and the respective links of each pair being pivoted to the corresponding packer adjacent the forward and rear ends thereof. The forward links 25 have their upper ends pivoted to the forwardly projecting arms of bell crank levers 26 which have their elbows pivoted or fulcrumed upon the respective body sections 1 and 2 in advance of the bearings 8 and above the packers 21, while the rear links 25 have their upper ends pivoted to the forwardly projecting arms of bell crank levers 27 which have their fulcrums pivoted or fulcrumed upon the respective body sections adjacent their rear ends and above the rear end portions of the packers 21. The upwardly or rearwardly projecting arms of each pair of bell crank levers 26—27, are connected by a link or connecting rod 28, whereby the levers 26—27 of each pair will oscillate together, for simultaneously raising and lowering the end portions of the corresponding packer.

The opposite pairs or sets of levers 26—27 are operatively connected, whereby they will operate simultaneously, to simultaneously raise and lower the two packers. To this end, the forward levers 26 have their elbow portions connected by a transverse rock shaft, constituting the sections 29 and 30 having their remote ends secured to the respective levers 26. The adjacent portions of the sections 29 and 30 are telescoped together, whereby the forward rock shaft will be extensible and contractible similar to the arch axle, the telescoping portions of the rock sections 29 and 30 being preferably non-circular in cross section so as to constrain the said shaft sections from oscillating or rotating relative to each other. The rear levers 27 are connected by a transverse rock shaft constituting the sections 31 and 32 having their remote ends secured to the elbow portions of the levers 27, and having their adjacent portions telescoped together similar to the sections 29 and 30 of the front rock shaft. The sections of the rock shafts may be adjusted longitudinally relative to each other, but are constrained to rotate or oscillate together, the tubular or outer portions of the telescoping portions having set screws or clamping means 33 for holding the sections of the rock shafts at any position to which they are set, corresponding to the arch axle.

A hand lever 33ª is secured to the section 29 of the front rock shaft, and is provided with manually operable means for engaging the segment 33′ secured upon the body section 2. The hand lever 33ª enables the front rock shaft 29—30 to be oscillated, for oscillating the front levers 26, which will oscillate the rear levers 27 accordingly, through the medium of the links or connecting rods 28.

The forward end of the body is provided with draft means, whereby the machine may be drawn along the soil, through the medium of draft animals, although a tractor or other draft means may be employed. In the present instance, a transversely adjustable coupling member 34 is mounted upon the forward end portion of the body section 1, in advance of the operator's seat, it being noted that the coupling member 34 may be adjusted transversely so as to be positioned midway between the side edges of the body according to the various circumstances. An upstanding bracket 35 is carried by the forward end of the coupling member 34 and the rear end or heel of the tongue 36 is adjustable vertically within the bracket 35, any suitable means being provided for securing the rear end or heel of the tongue to the said bracket.

As a means for supporting the tongue 36 at the proper position desired, a vertically elongated loop-shaped bracket 37 is provided in advance of the body, and which has the tongue 36 passed therethrough. Extensible arms 38 are connected to the sides of the bracket 37 and the inner sides or wings of the plow shares. The tongue 36 is adjustable vertically within the bracket 37. A marking or guiding device is also provided whereby the furrows or ditches may be properly spaced apart. The guiding or marking device embodies an extensible pole 39 having its inner end pivoted or loosely connected to the rear end of the coupling member 34 at the forward end of the body, and having an arm 40 loosely connected to its outer end. The pole 39 is adapted to be disposed transversely of the machine, so as to project to and beyond one side of the body, a marking or guiding disk 41 being carried by the lower or free end of the arm 40.

The pole 39 is adapted to be swung to either side, and in order to hold the pole 39 at either side, a pair of U-shaped keepers 42 are secured upon the side edge portions of the body sections 1 and 2 adjacent the forward end of the body and are adapted to receive the intermediate portion of the pole 39. Cotter pins or other retaining elements 43 are engageable through the arms of the keepers 42 for holding the pole 39 within one or the other keeper, according to the position of the pole.

In use, when the machine is to be drawn idly over the soil from one location or place to another, the packers 21 and plow shares 18 having been raised, the arch axle is swung properly through the medium of the lever 10, as above described, to swing the ground wheels 7 downwardly, as seen in Figs. 2 and 3, whereby the ground wheels may run upon the soil, with the packers, plow shares and other parts elevated or out of contact with the soil. Now, when the machine is to be brought into operation for forming the ditches, the body 1—2 may be depressed, or permitted to gravitate, by swinging the arch axle in such a direction as to swing the ground wheels 7 upwardly relative to the body, which will enable the plow shares and packers to come into contact or coöperative relation with the soil. The amount of depression of the plow shares and packers into the soil, will of course be governed by the positions of the ground wheels 7 relatively to the body. Then, as the body is drawn forwardly, the plow shares will break open the furrows or trenches, and the packers trailing or following the shares, will pack the soil at the sides of the furrow or trench to render the walls of the furrow compact, and to thereby prevent the soil or ground from falling back into the furrow.

The packers and plow shares may be adjusted vertically, to regulate the depth of the furrows or trenches formed, this being readily accomplished by manipulating the hand lever 33ª, to swing the bell crank levers 26 and 27 correspondingly to either raise or lower the packers, as will be obvious. Thus, when the hand lever 33ª is swung forwardly, the links 25 will be dropped or depressed, to thereby drop or depress the packers 21 and the plow shares 18 carried by the forward ends thereof, to increase the depth of the furrows or trenches, and when the hand lever 33ª is swung rearwardly, the packers 21 and plow shares will be raised to decrease the depth of the furrows.

The distance between the two trench or ditch-forming devices, may be varied, according to the circumstances, this being readily accomplished by drawing the body sections apart or together, more or less, to properly position the packers and plow shares. The arch axle 4—5 and the rock shafts 29—30 and 31—32, being extensible, may adjust themselves to the positions of the body sections relative to each other, and the operator's seat may also be adjusted transversely so as to assume a median position. In a similar manner, the coupling member 34 may be adjusted transversely to assume a median position, and the arms 38 may be properly adjusted to position the bracket 37 directly in advance of the bracket 35 to hold the tongue 36 at a proper longitudinal position. The pole 39 may also be adjusted in order to space the marking or guiding disk 41 at a distance from the adjacent share and packer equal to the distance between the two shares and packers.

The swinging or oscillatory arm 40 permits the disk 41 to trail loosely upon the soil, or in the previously formed furrow or ditch, to assist in properly guiding the machine, as will be obvious. The pole 39 may be swung to the opposite sides, according to the various conditions, or when the machine is reversed at the ends of the furrows.

When the machine is being reversed at the end of the field, or furrows, to commence the succeeding furrows or ditches, the body may be elevated by swinging the ground wheels 7 downwardly, in order to permit the machine to be readily turned around, in which event, the body may again be lowered to bring the ditch-forming elements into operative position.

From the foregoing, taken in connection with the drawings, the several advantages and capabilities of the present invention will be obvious to those skilled in the art, without further comment being necessary. It is to be observed, that in the present structure, as illustrated and described, the ditch-forming devices are duplicated, and are operatively connected in a peculiar manner, but it is to be understood that the ditching machine may be provided with only a single ditch-forming device, if desired, and in which event the various provisions for transverse adjustments will be eliminated. Thus, as suggested in Fig. 5, the body 1' need only be in one piece, as well as the arch axle 4', when a single ditch-forming device 21' is carried by the body 1'.

Having thus described the invention, what is claimed as new is:

1. In a ditching machine, a body, a longitudinal depending guide carried thereby, a packer movable vertically within the guide, and a plow share carried by the forward end of the packer.

2. In a ditching machine, a body, a guide comprising depending aprons carried thereby, a vertically adjustable packer mounted between the said aprons, and a plow share carried by the forward end of the packer, the upper end portion of the plow share projecting above the packer, and the body having an opening through which the upper end portion of the share passes.

3. In a ditching machine, a body, a guide comprising an inverted channel member having its back secured to the bottom of the body, a packer mounted for vertical movements within the said channel, adjusting means carried by the body and connected to the packer, and a plow share having its upper end portion slidable through the body and including rearwardly projecting side wings secured over the forward end portion of the packer.

4. In a ditching machine, a body comprising laterally adjustable sections, an extensible arch axle constituting telescoping sections journaled to the respective sections of the body, ground wheels journaled to the remote ends of the axle sections, coöperating means carried by one body section and one axle section for oscillating the axle, a ditch-forming device carried by each body section, means carried by each body section and operatively connected to the corresponding ditch-forming device to raise and lower the same, and a shaft comprising telescoping sections connecting said means.

In testimony that I claim the foregoing as my own, I have hereto affixed my signature in the presence of two witnesses.

EVEND T. HEGGLAND.

Witnesses:
S. M. SUMMERFIELD,
B. B. SHEPHERD.